Patented Nov. 8, 1932

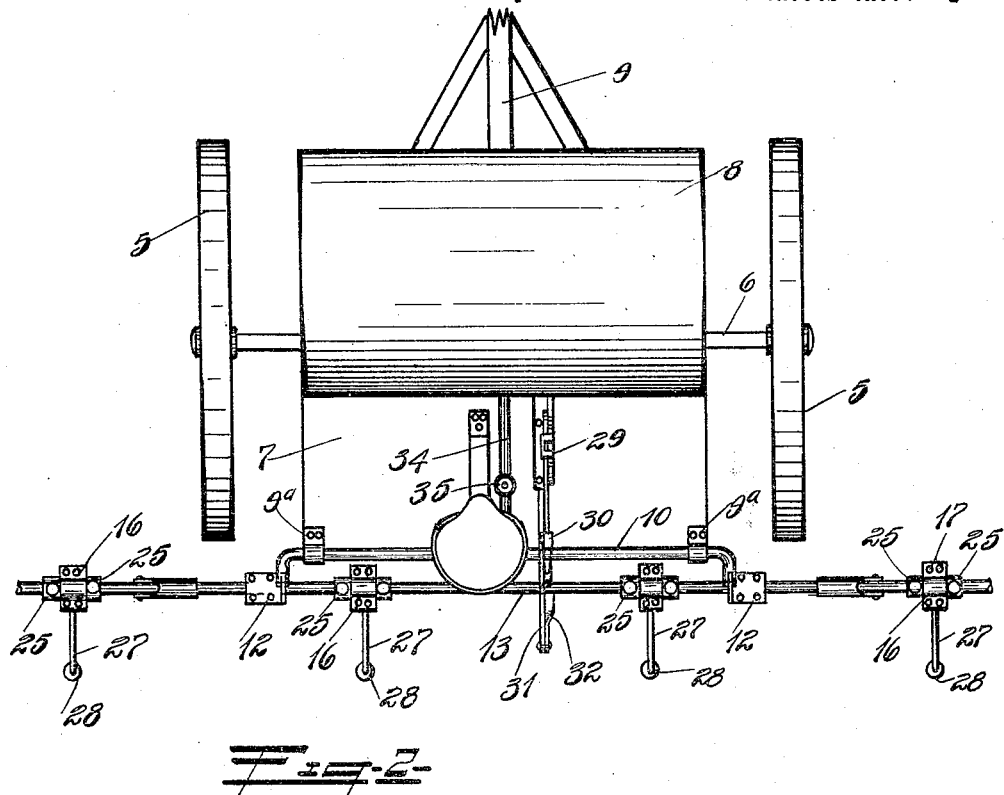

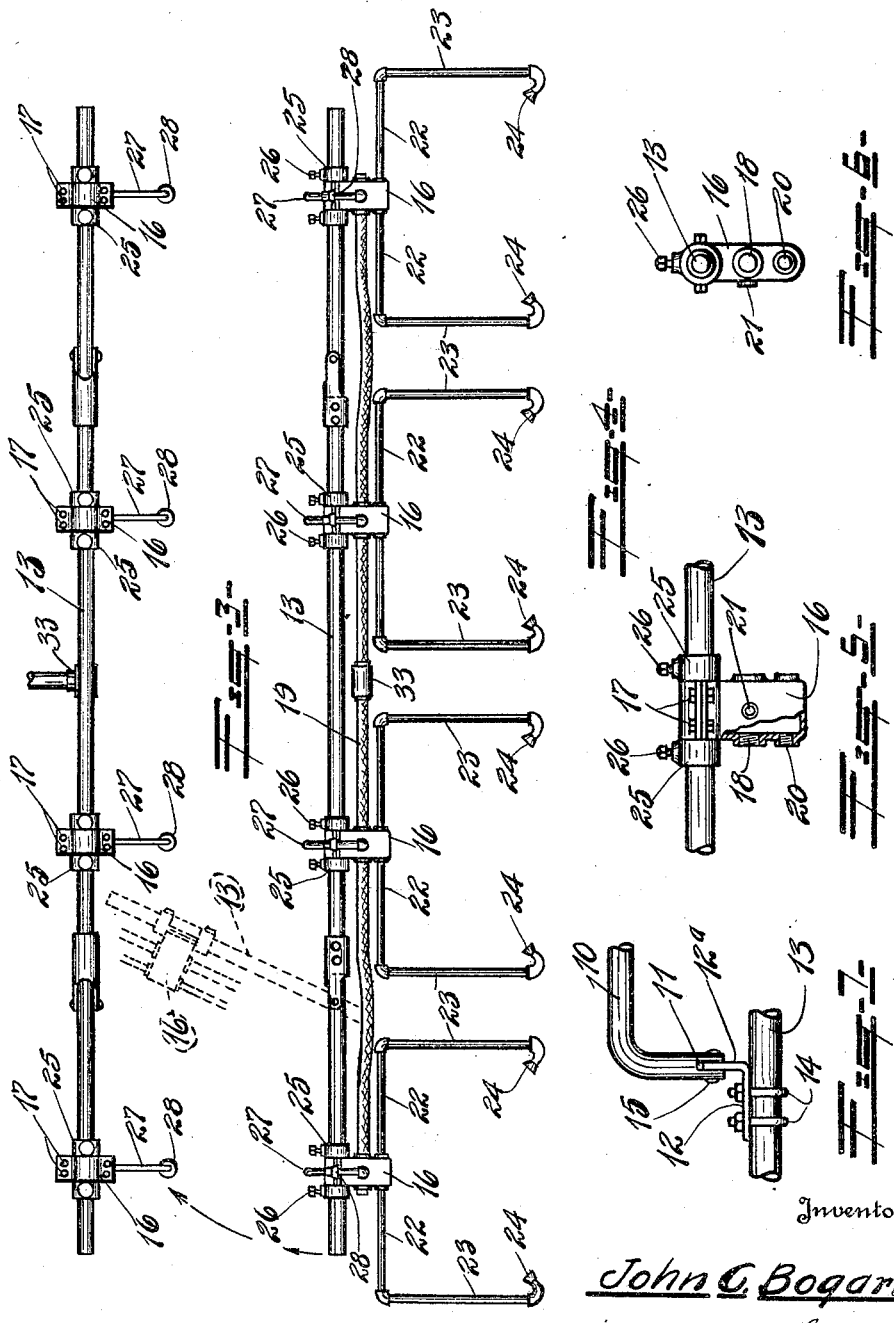

1,886,369

UNITED STATES PATENT OFFICE

JOHN C. BOGART, OF BAY CITY, MICHIGAN

TRACTION SPRAYER

Application filed September 19, 1930. Serial No. 482,980.

This invention relates to traction sprayers, and more particularly to the boom and the manner of mounting the spray attachments thereon.

One object of the invention is to pivotally secure the spray attachments to the boom, so that they can freely swing when engaging a raised knoll or other object, or when the draft pole of the machine is raised, as occurs when turning at the ends of the rows.

Another object is to so mount the spray attachments that they can be readily adjusted to suit rows of various widths, and provide set collars on said boom for holding said attachments in set position.

A further object is to provide means for raising the boom and attachments, and also provide reversible spraying means for spraying low or high crops as occasion demands.

With the above and other objects in view, the present invention consists in the combination and arrangement of parts, hereinafter more fully described, illustrated in the accompanying drawings, and particularly pointed out in the appended claim, it being understood that changes may be made in the form, size, proportion, and minor details of construction, without departing from the spirit, or sacrificing any of the advantages of the invention.

In the drawings:

Fig. 1 is a side view showing my improved sprayer.

Fig. 2 is a top plan view thereof.

Fig. 3 is an enlarged detail plan view of the boom and spray attachments.

Fig. 4 is a back view thereof, the dotted lines showing one end of the boom swung up for travel.

Fig. 5 is an enlarged part sectional detail of one of the headers.

Fig. 6 is an edge view thereof.

Fig. 7 is a fragmentary detail showing the manner of connecting the boom to the frame.

Traction sprayers at present in general use are provided with spray attachments which are rigidly mounted on the boom, and as crops are planted in rows of various widths, it is necessary that these attachments be adjusted to meet these conditions, adjustment of the conventional type sprayer attachments is very difficult, and the boom and attachments are very frequently bent due to the lack of flexibility, and I have therefore designed a very simple and practical boom connection which is pivotally connected and which can be easily adjusted.

Conventional traction sprayers are usually provided with a pump for maintaining a pressure in the tank, and a dasher or agitator is also provided for agitating the spray liquid used, this is however immaterial as this invention is directed to the spray attachments and the manner of mounting on the boom.

Referring now more particularly to the drawings, the numeral 5 indicates a pair of ground engaging wheels which are journaled on an axle member 6 in the usual manner, a fabricated frame 7 is securely mounted on said axle and a tank 8 is mounted on the frame in any approved manner and is usually provided with an agitator as above described. A draft pole 9 projects from the front end of the frame so that horses or a tractor may be hitched thereto and to provide the necessary motive power, this is however all of conventional design and forms no part of the present invention.

Bearings 9 are provided on the frame in spaced apart relation, and a shaft 10, preferably formed of pipe, is journaled therein, the ends being bent downwardly, and are split as shown at 11 to accommodate the upstanding leg 12a of an angle 12 which is secured to the boom 13 by means of U-bolts 14, a bolt 15 serving to pivotally connect the shaft to the angle.

Headers 16 are pivotally mounted on the boom 14 in spaced apart relation, the upper end being formed similar to a split bearing and is provided with bolts 17 so that it can be readily secured and detached. Horizontally disposed openings 18 are provided in the side of said header, and a flexible hose 19 is adapted to be connected thereto, threaded openings 20 being provided adjacent the bottom edge of the header, and a similar threaded opening 21 is provided in the back wall, and to which the center spray attachment is connected.

The side sprays comprise horizontally disposed pipe members 22 which are threaded into the opening 20, thence leading downwardly as shown at 23, and thence inwardly, and having a spray nozzle 24 secured to the end thereof, these nozzles 24 are adjustable on the members 23 so that they can be set at the required angle so that the spray thoroughly covers the underside of the foliage.

Set collars 25 are provided on both sides of the headers and a set nut 26 secures said collars in position.

The center spray comprises a pipe member 27 which is threaded into the opening 21, the pipe thence leads upwardly, horizontally, and downwardly, and a similar spray nozzle 28 is threaded thereon, and when spraying high crops, this center spray will be in position as shown in full lines in Fig. 1 of the drawings, but when spraying low crops, this position will be reversed, and as illustrated in dotted lines in Fig. 1.

The boom is jointed to permit the ends to be swung up, as indicated by dotted lines in Fig. 3 of the drawings, so that the machine will pass through gates and other standard width openings.

The boom raising mechanism comprises a conventional quadrant assembly 29 provided with a lever 30 in the usual manner, a link 31 being connected to said lever, the opposite end of said link being connected to an arm 32 which is securely riveted to the boom proper, and it will be clearly obvious that actuation of the lever 30 raises or lowers the boom accordingly.

The flexible hose 19 is provided with a centrally disposed T fitting 33 as shown and a hose 34 leads to the tank connection and is provided with a valve 35 for regulating the supply of spray liquid fed to the headers.

From the foregoing description it will be clearly obvious that I have perfected a very simple, practical, and substantial spray boom and mounting.

What I claim:—

In a device of the character described, the combination with a horizontally disposed boom, of a plurality of headers journaled thereon by means of detachable caps, set collars adjustably mounted on the boom for limiting movement of the headers along the boom, upper and lower openings in each of said headers, flexible supply means suitably connecting the upper openings of the headers together, and discharge pipes connected to the lower openings and provided with spray nozzles on the ends thereof.

In testimony whereof I hereunto affix my signature.

JOHN C. BOGART.